United States Patent [19]
Elliott et al.

[11] Patent Number: 5,621,904
[45] Date of Patent: Apr. 15, 1997

[54] METHOD AND APPARATUS FOR AVOIDING OVERLAPPED WINDOWS AND A GUTTER SPACE

[75] Inventors: John D. Elliott, Aloha; Rune A. Skarbo, Hillsboro; Kevin A. Watts, Portland, all of Oreg.

[73] Assignee: Intel Corporation, Santa Clara, Calif.

[21] Appl. No.: 377,081

[22] Filed: Jan. 24, 1995

[51] Int. Cl.⁶ .................................................. G06F 3/00
[52] U.S. Cl. .............................................................. 395/342
[58] Field of Search ........................... 395/155–161; 345/117–120

[56]                References Cited

U.S. PATENT DOCUMENTS

| | | | |
|---|---|---|---|
| 4,789,962 | 12/1988 | Berry et al. | 395/157 |
| 5,287,448 | 2/1994 | Nicol et al. | 395/159 |
| 5,428,733 | 6/1995 | Carr | 395/159 |
| 5,487,143 | 1/1996 | Southgate | 395/157 |

OTHER PUBLICATIONS

Cohen et al, "Automatic Strategies in the Siemens RTL Tiled Window Manager", IEEE, 1988, pp. 111–119.

*Primary Examiner*—Mark R. Powell
*Assistant Examiner*—John E. Breene
*Attorney, Agent, or Firm*—William H. Murray; N. Stephan Kinsella

[57]                ABSTRACT

A computer-implemented method and video processing system for positioning windows displayed on a screen of the video processing system. According to a preferred embodiment, the size of the screen is determined, and the position and size of a first window displayable on the screen is determined. The size of a new window to be displayed on the screen is also determined. It is then determined whether there is room to display the new window plus a gutter space outside the first window and within the screen, and the position of the new window is set in accordance with this determination.

36 Claims, 5 Drawing Sheets

METHOD AND APPARATUS FOR AVOIDING OVERLAPPED WINDOWS AND A GUTTER SPACE

BACKGROUND OF THE INVENTION

Field of the Invention

The present invention relates to video applications and, in particular, to computer-implemented processes and apparatuses for positioning windows such that the display of other important information is not obscured.

Description of the Related Art

Computer systems commonly display information on video monitors through the use of overlapping windows. Referring now to prior art video display 100 of FIG. 1, there is shown a rectangular video screen 101 displaying two rectangular windows 102 and 103. Parent window 102 is, in the illustrated example, a window that displays a "snapshot" or video image (image not shown), for further viewing, selection, or manipulation by a user. Often a new window 103 needs to be displayed to offer choices to the user. Such windows are also referred to as "dialog boxes" or dialog windows. In the illustrated example, new window 103 is displayed after the user has requested that the snapshot displayed in window 102 be closed. New window 103 requests a confirmation of the close request, and asks the user if the snapshot shown in window 102 should be saved before window 102 is closed.

In such applications, a window such as window 102 is considered to be a "parent window" with respect to a new window to be displayed, such as new window 103. A new window is typically related to its parent window in that the new window displays information related to its parent window. When a parent window such as window 102 is currently displayed and a new window such as new window 103 is to be displayed as well, a default position for the new window is typically selected, such as the center of the new window's parent window. Thus, as illustrated in FIG. 1, new window 103 is positioned over the center of its parent window, window 102.

Unfortunately, such positioning can obscure important information otherwise displayed in the parent window. For example, in exemplary video display 100 of FIG. 1, in order to respond to the prompt of new window 103, the user must decide whether he or she wishes to save the snapshot displayed in snapshot window 102. However, because new window 103 is centered by default on top of the snapshot displayed in window 102, the user may have to manually move new window 103 out of the way in order to view the snapshot, before responding to the prompt of new window 103. Other default positions of new windows can also obscure useful information, since the position of the parent window and relative size of the parent and new windows are unpredictable. For example, if a new window is placed by default in the center of screen 101 rather than in the center of parent window 102, it may still obscure important information displayed in parent window 102, depending upon the size and position of parent window 102.

Such use of default positioning of new windows can thus obscure useful information shown in their parent windows. Such positioning can therefore cause inconvenience to a user, and can reduce the efficiency of operation of the computer. Additionally, besides obscuring information (graphical or otherwise) contained within a parent window, such overlap of the new window and its parent window can be annoying to a user.

There is thus a need for a video processing system and method that more intelligently positions new windows to reduce the aforementioned problems.

Further objects and advantages of this invention will become apparent from the detailed description of a preferred embodiment which follows.

SUMMARY

The previously mentioned needs are fulfilled with the present invention. There is provided herein a computer-implemented method and video processing system for positioning windows displayed on a screen of the video processing system. According to a preferred embodiment, the size of the screen is determined, and the position and size of a first window displayable on the screen is determined. The size of a new window to be displayed on the screen is also determined. It is then determined whether there is room to display the new window outside the first window and within the screen, and the position of the new window is set in accordance with this determination.

BRIEF DESCRIPTION OF THE DRAWINGS

These and other features, aspects, and advantages of the present invention will become more fully apparent from the following description, appended claims, and accompanying drawings in which:

DESCRIPTION OF THE PREFERRED EMBODIMENT

Figure 1:
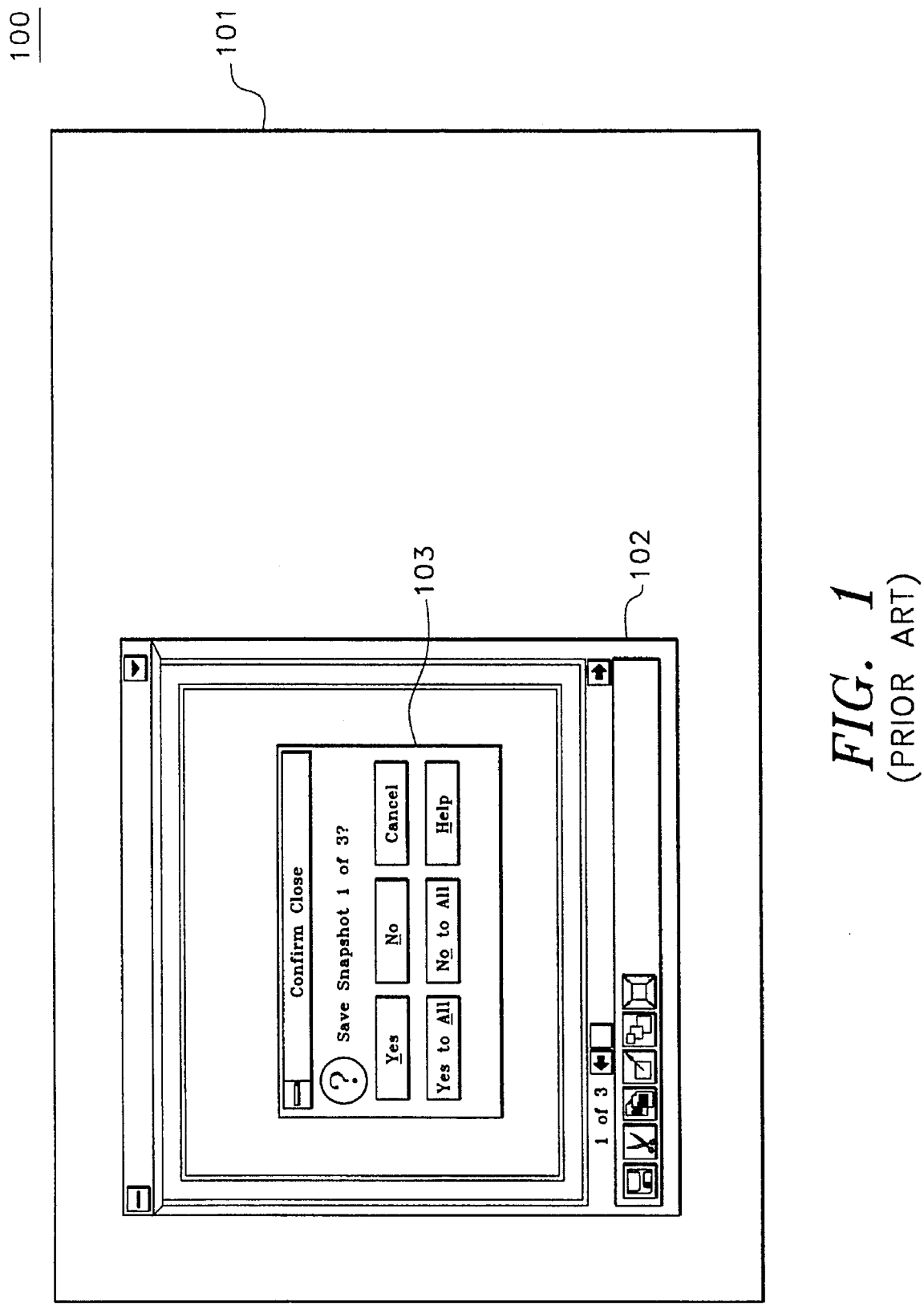
FIG. 1 depicts a prior art video display displaying a video screen, a parent window, and a new window.
Figure 2:
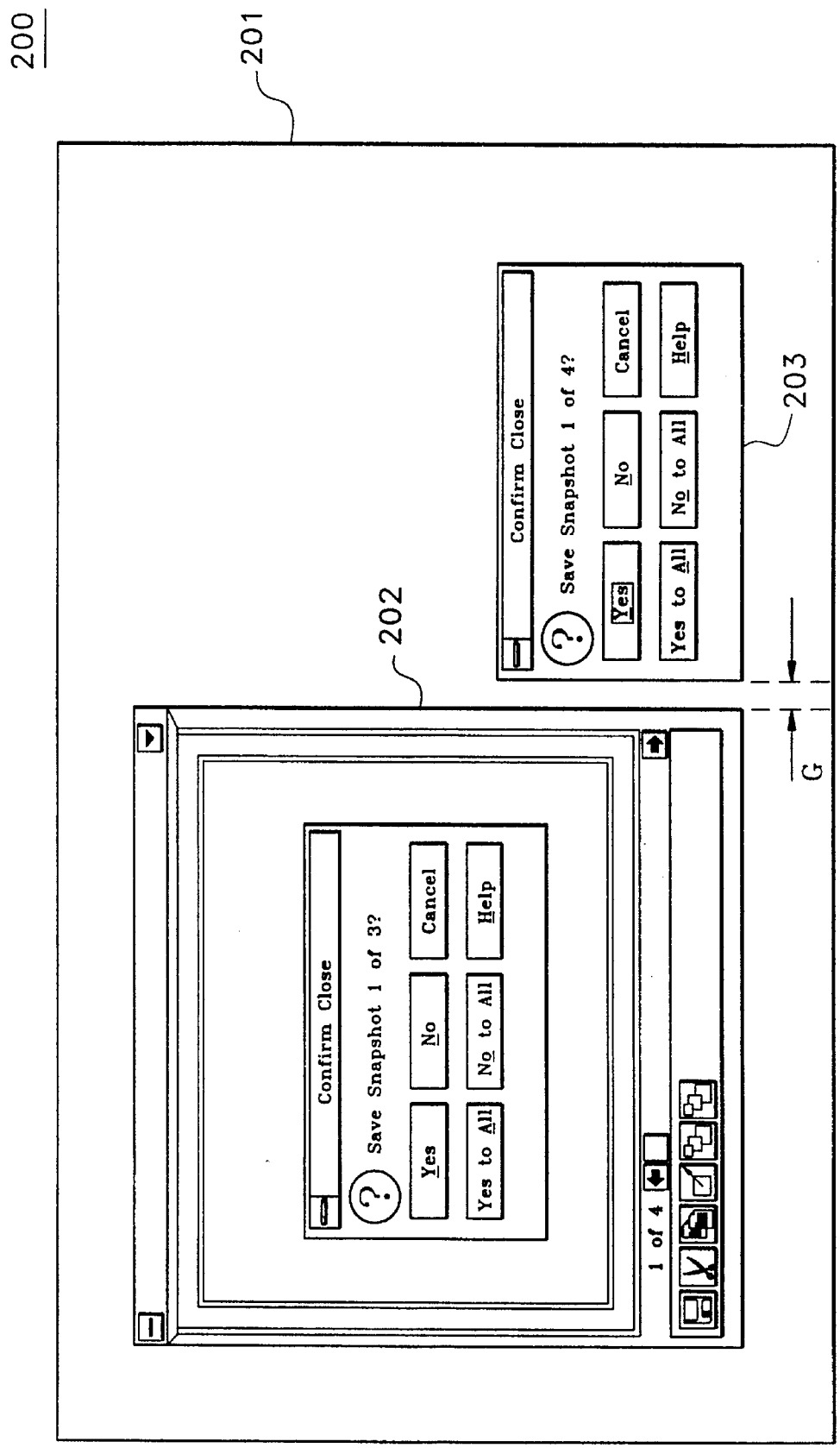
FIG. 2 depicts a video screen, a parent window, and a new window displayed on a video display of a preferred video processing system in accordance with the present invention.

Referring now to FIG. 2, there is depicted a video screen 201, a parent window 202, and a new window 203 displayed on a video display of a preferred video processing system 200 in accordance with the present invention. New window 203 is a new window which is positioned and displayed after its parent window 202. Those skilled in the art will appreciate that screen 201 represents, in general, the area in which windows such as parent window 202 and new window 203 may be displayed on a monitor (not shown). For example, the borders of screen 201 may represent the physical edges of the viewable portion of a video monitor. Alternatively, screen 201 may represent a desktop window or area displayed on a monitor. When desktop environments are utilized, typically displayed images such as windows 202, 203 are displayed within the boundaries of the desktop represented by screen 201. An example of a system utilizing such a display environment is the Intel® Proshare™ Video System. Such environments utilizing parent windows and dialog windows are often referred to as graphical user interfaces (GUIs).

Thus, those skilled in the art will appreciate that the left, right, top, and bottom boundaries of screen 201, whether screen 201 represents a desktop window or the physical dimensions of a video monitor, provide a screen environment in which windows 202, 203 are displayable. For convenience the upper, left corner of screen 201 may be designated as the origin, having pixel position 0,0. The right side of screen 201 is representable in program code as screen.right, as will be appreciated by those skilled in the art. The top, bottom, and left sides of screen 201 have similar nomenclatures. Screen 201, parent window 202, and new window 203 are rectangular in shape, and thus the position and size of each may be represented with four coordinates: the X,Y position of the upper left corner, and the width and height of the rectangle, for example.

The present invention exploits the fact that there is sometimes room between parent window 202 and the boundaries of screen 201 to place new window 203 so that the display of new window 203 does not obscure information displayed within its parent window 202. For example, as illustrated in FIG. 2, new window 203 is displayed to the right of parent window 202 rather than at a default position such as the center of parent window 202, because there is room to place the entire new window 203 outside of the boundaries of parent window 202, so that both parent window 202 and new window 203 may be displayed in full. In this manner, new window 203 is placed such that it does not block or obscure parent window 202. In cases where there is no room outside the parent window to place the new window, a default position may be resorted to, such as the center of parent window 202 or the center of screen 201. In one preferred embodiment of the present invention, new window 203 is placed a predetermined pixel distance away from the nearest side of parent window 202, referred to as a "gutter," as illustrated by gutter G in FIG. 2.

Figure 3:
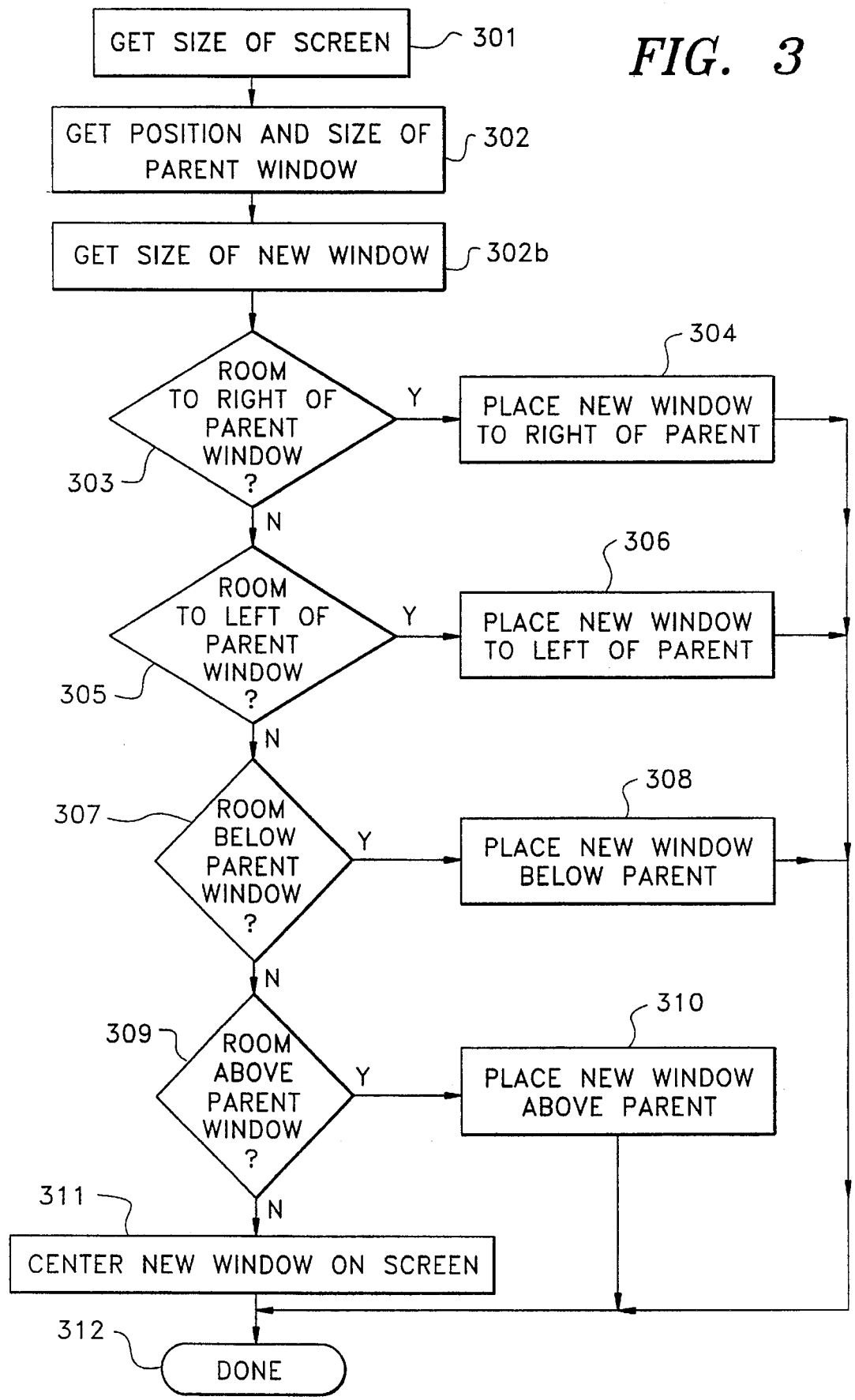
FIG. 3 is a flow chart of the method of operation of the video processing system of FIG. 2.

Referring now to FIG. 3, there is shown a flow chart illustrating the method of operation of a preferred embodiment of video processing system 200 of FIG. 2. In step 301 of FIG. 3, the size of the relevant screen is retrieved. This step returns coordinates indicating the position of the upper, left corner of screen 201 (always 0,0, the origin) as well as coordinates indicating the position of the lower, right corner of screen 201 expressed in the number of pixels from the origin. As explained above, these parameters of screen 201 may represent the size of the screen of a monitor (not shown) or of a desktop area displayed on a monitor within a GUI. Parent window 202 is referred to as "parent" and new window 203 is represented by "new window" in the flow chart of FIG. 3.

The position and size of parent window 202 are also retrieved (step 302), as well as the size of the new window to be displayed (step 302b). It will be appreciated that at this point, parent window 202 is currently displayed within screen 201 at a certain position or already has a designated position, and also has a certain dimensional size. New window 203 has a given size but its currently-designated position may be ignored as irrelevant.

After the size of screen 201 and new window 203 are determined, and the size and position of parent window 202 is determined, the method of the present invention tests to see whether there is room to place new window 203 to the right of parent window 202 (step 303). As will be appreciated by those skilled in the art, this test comprises the steps of comparing the distance, in pixels, between parent.right and screen.right with the width of new window 203. As will be appreciated by those skilled in the art, this step may be performed by the following source code:

if(parent.right+newWindow.width()<=screen.right).

If this test indicates a true result, there is room to place the entire width of new window 203 between the right side of parent window 202 and the right side of screen 201. If this is implemented, then all of new window 203 will be visible, next to parent window 202, without obscuring any of the information displayed in parent window 202. Alternatively, if it is to be ensured that at least a minimum spacing can be placed between parent window 202 and new window 203 (so that these windows do not touch one another or are otherwise too close to one another), the test can be modified to return a true result only when there is room for new window 203 plus a gutter, as illustrated in the following code:

if(parent.right+gutter+newWindow.width()<=screen.right).

If step 303 indicates that the new window 203 has room to be displayed in whole to the right of parent window 202, then new window 203 is placed to the right of parent window 202.

If there was no room to place new window 203 to the right of parent window 202, then a test is made to determine if there is room to fit new window 203 to the left of parent window 202 (step 305). If so, new window 203 is placed to the left of parent window 202 (step 306), i.e., the entire width of new window 203 lies between screen.left and parent.left.

If there was no room to place new window 203 to the right or left of parent window 202, then similar tests are made to see if there is room to place new window 203 above, or below, parent window 202 (steps 307–310). Therefore, if there is room to the right, left, top, or bottom of parent window 202, new window 203 will be successfully positioned and placed outside parent window 202.

However, if either or both parent window 202 or new window 203 are too large in comparison to the size of screen 201, given the position of parent window 202, none of tests 303, 305, 307, or 309 will find room outside parent window 202 to place new window 203. If none of these four tests are successful and there is no room to place new window, then new window 203 is placed in the center of screen 201 (step 311). Alternatively, new window 203 may be placed at other default positions, such as at the center of parent window 202, or at the initial position that new window 203 would have been displayed before step 302b.

Figures 4, 4A, 4B:
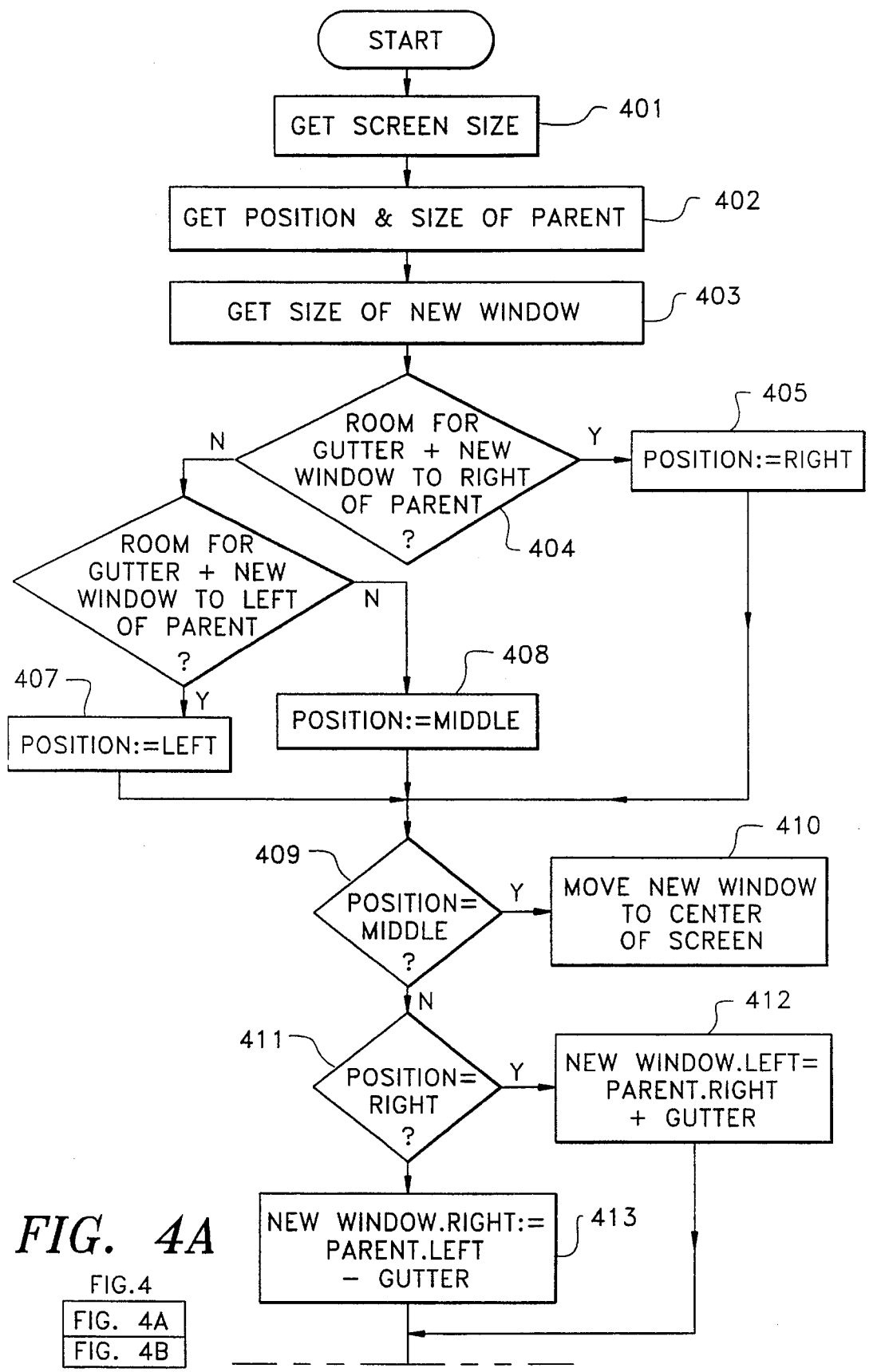
FIG. 4 is a flow chart of an alternative preferred method of operation of the video processing system of FIG. 2 in accordance with the present invention.
Figure 4B:
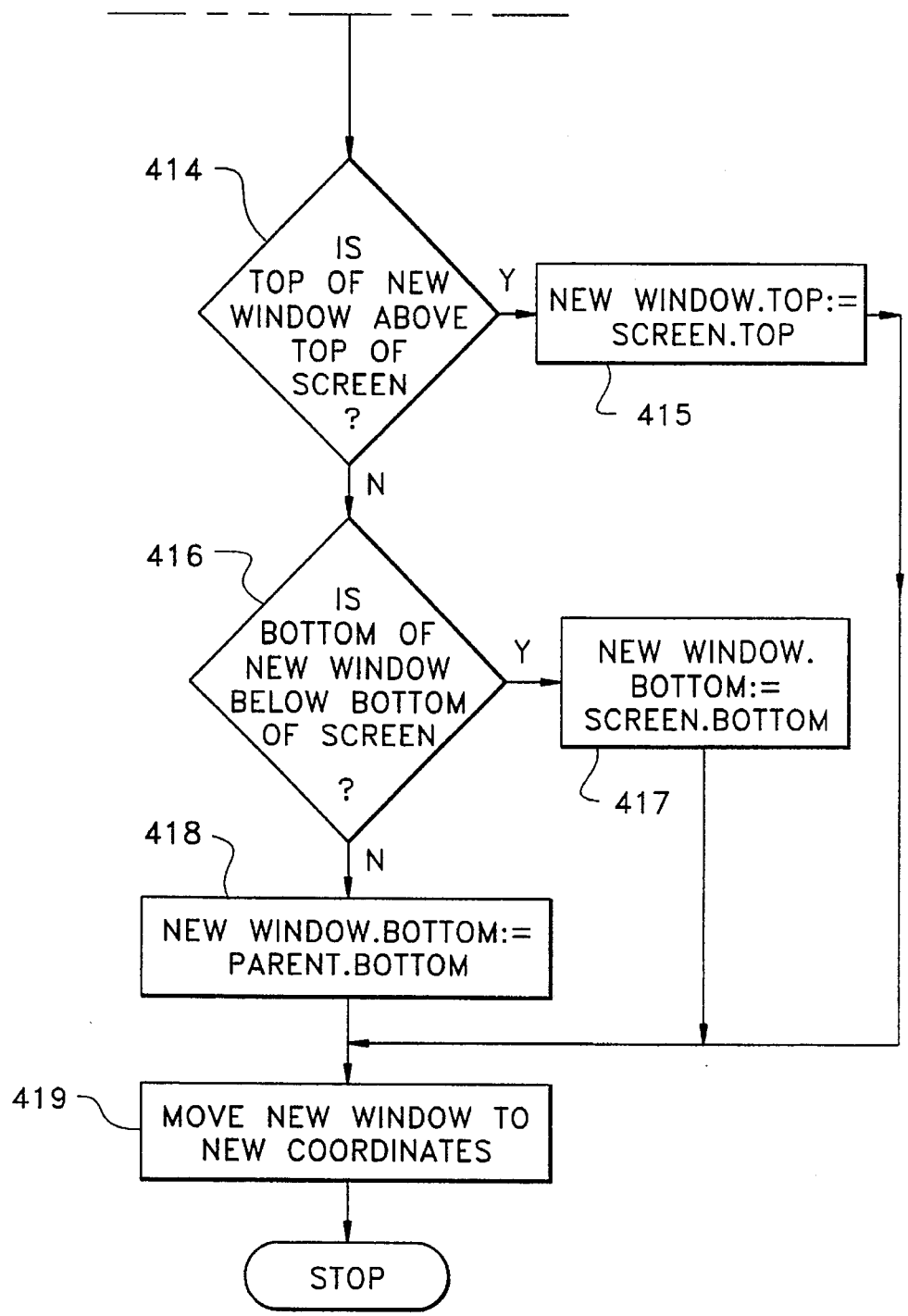

Referring now to FIG. 4, there is shown a flow chart illustrating an alternative preferred method of operation of video processing system 200 of FIG. 2 in accordance with the present invention. In this embodiment, an attempt is made to display new window 203 only to the right or left of parent window 202, and the gutter width described hereinabove is explicitly taken into account. In step 401, video processing system 200 gets the size of screen 201. The position and size of parent window 202, and the size of new window 203 are also retrieved (steps 402, 403).

Thereafter, it is determined whether there is room for the gutter plus new window 203 to the right of parent window 202 (step 404 of FIG. 4). Those skilled in the art will realize that such a test may be implemented in source code as follows:

if(parent.right+gutter+newWindow.width()<=screen.right).

If so, a variable position is set to "right", or position :=right (step 405). If there is not room to the right, then a similar test is made to determine if there is room for the gutter plus new window 203 to the left of parent window 202 (step 406). Code that can implement such a test is listed as follows:

if (parent.left–gutter–newWindow.width()>=screen.left).

If this test results in true, then position is set to "left," or position :=left (step 407). Otherwise, if the position variable has not been set to left or right, then it is set to "middle" (step 408).

Thereafter, if position=middle (step 409), then new window 203 is moved to (and thus displayed at) the center of screen 201 (step 410). If position is not set to middle, then if position=right (step 411), then the left side of new window 203 is set to the right side of parent 202 plus the gutter spaces (step 412), although new window 203 is not yet displayed at this step. Step 412 may be described in code as follows, as will be understood by those skilled in the art:

newWindow.left :=parent.right+gutter.

If position was not middle or right, then it is deduced that position=left and thus the right side of new window 203 is set to the left side of parent window 202 minus the gutter (step 413), or:

newWindow.right :=parent.left–gutter.

At this point, if position=right or left, then new window 203 has not yet been displayed, but has had its horizontal position determined. However, before displaying new window 203 either to the left or right of parent window 202 (depending upon its horizontal position as set in step 412 or 413), further steps in the method illustrated in FIG. 4 attempt to line up the bottom of new window 203 with the bottom of parent window 202, while ensuring that all of new window 203 will be visible on screen 201. For example, if the bottom half of parent window 202 were moved off the bottom of screen 201 and thus invisible, leaving only the top half of parent window 202 visible within screen 201, then it would not be desirable to set newWindow.bottom :=parent.bottom, because all or part of new window 203 would be not appear on screen 201. Thus, steps 414 and 416 ensure that, with newWindow.bottom temporarily assumed to be equal to parent.bottom, new window 203 does not extend above screen.top or below screen.bottom.

Thus, in step 414 a test is made to determine if the top of new window 203 would be above the top of screen 201, which may be represented in code as:

if(parent.bottom–newWindow.height()<screen.top).

If this test results in true, then new window 203's vertical position is set so that its top is flush with the top of screen 201 (step 415), or:

newWindow.top :=screen.top.

If the top of new window 203 would not be placed above the top of screen 201 if its bottom were equal to the bottom of parent window 202, then in step 416 a test is made to determine if the bottom of parent window 202 is below the bottom of screen 201, or:

else if (parent.bottom>screen.bottom).

If this test is true, then it may be deduced that the bottom of new window 203 would also be below the bottom of screen 201 if its bottom were set flush to that of parent window 202. Thus, in this case, the vertical position of new window 203 is set so that its bottom is equal to the bottom of screen 201 (step 417), or:

newWindow.bottom :=screen.bottom.

If neither of the tests in steps 414 and 416 are true, then the bottom of new window 203 may be set equal to the bottom of its parent window 202 without any of new window 203 extending vertically off screen 201. Therefore, in step 418, newWindow.bottom :=parent.bottom.

At this point, unless new window 203 was not able to be placed outside parent window 202 and was thus already moved to the center of screen 201 (steps 409–410), then new window 203 will have horizontal and vertical coordinates that will place it either to the right or to the left of parent window 202, and vertically within the top and bottom of screen 201. Therefore, in step 419 new window 203 is moved to these new coordinates.

It will be appreciated that the methods of FIGS. 3 and 4 of operations of video processing system 200 may be implemented on a video processor or on a suitable general-purpose processor, and may be integrated into a GUI or windows control system utilized on the processor.

It will be understood that various changes in the details, materials, and arrangements of the parts which have been described and illustrated above in order to explain the nature of this invention may be made by those skilled in the art without departing from the principle and scope of the invention as recited in the following claims.

What is claimed is:

1. A computer-implemented method for positioning windows displayed on a screen of a video processing system, comprising the steps of:

(a) determining the size of the screen;

(b) determining the position and size of a first window displayable on the screen;

(c) determining the size of a new window to be displayed on the screen;

(d) determining whether there is room to display the new window plus a predetermined gutter space outside the first window and within the screen; and (e) setting the position of the new window in accordance with the determination of step (d).

2. The method of claim 1, wherein the first window has a parent relationship with respect to the new window.

3. The method of claim 1, wherein the screen comprises a desktop window.

4. The method of claim 1, further comprising the step of:

(f) displaying the new window on the screen at the position determined in step (e).

5. The method of claim 1, wherein step (e) comprises the step of:

(1) if there is room to display the new window plus the predetermined gutter space outside the first window and within the screen, then setting the position of the new window such that the new window may be displayed outside the first window and within the screen with at least the predetermined gutter space separating the first window and the new window.

6. The method of claim 1, wherein steps (d) and (e) comprise the steps of:

(1) determining whether there is room to display the new window plus the predetermined gutter space to the right of the first window and within the screen and, if so, setting the position of the new window accordingly;

(2) else determining whether there is room to display the new window plus the predetermined gutter space to the left of the first window and within the screen and, if so, setting the position of the new window accordingly;

(3) else determining whether there is room to display the new window plus the predetermined gutter space below the first window and within the screen and, if so, setting the position of the new window accordingly;

(4) else determining whether there is room to display the new window plus the predetermined gutter space above the first window and within the screen and, if so, setting the position of the new window accordingly;

(5) else setting the position of the new window to the center of the screen.

7. The method of claim 1, wherein steps (d) and (e) comprise the steps of:

(1) determining whether there is room to display the new window plus the predetermined gutter space to the right of the first window and within the screen and, if so, setting the horizontal position of the new window to the right of the first window plus the gutter space;

(2) else determining whether there is room to display the new window plus the gutter space to the left of the first window and within the screen and, if so, setting the horizontal position of the new window to the left of the first window plus the gutter space;

(3) else setting the position of the new window to the center of the screen.

8. The method of claim 7, wherein steps (d) and (e) comprise the further steps of:

(4) if the position of the new window is not set to the center of the screen, then determining whether the top of the new window is above the top of the screen when the bottom of the new window is equal to the bottom of the first window and, if so, setting the top of the new window equal to the top of the screen;

(5) else determining whether the bottom of the new window is below the bottom of the screen when the bottom of the new window is equal to the bottom of the first window and, if so, setting the bottom of the new window equal to the bottom of the screen;

(6) else setting the bottom of the new window equal to the bottom of the first window.

9. The method of claim 7, wherein steps (d) and (e) comprise the further step of:

(4) setting the vertical position of the new window such that the new window may be displayed within the top and bottom of the screen.

10. A video processing system for positioning windows displayed on a screen of the video processing system, the video processing system comprising:

(a) means for determining the size of the screen;

(b) means for determining the position and size of a first window displayable on the screen;

(c) means for determining the size of a new window to be displayed on the screen;

(d) means for determining whether there is room to display the new window plus a predetermined gutter space outside the first window and within the screen; and (e) means for setting the position of the new window in accordance with the determination of means (d).

11. The video processing system of claim 10, wherein the first window has a parent relationship with respect to the new window.

12. The video processing system of claim 10, wherein the screen comprises a desktop window.

13. The video processing system of claim 10, further comprising:

(f) means for displaying the new window on the screen at the position determined by means (e).

14. The video processing system of claim 10, wherein means (e) comprises means for setting the position of the new window such that the new window may be displayed outside the first window and within the screen with at least the predetermined gutter space separating the first window and the new window, if there is room to display the new window plus the predetermined gutter space.

15. The video processing system of claim 10, wherein means (d) and (e) comprise means for performing the steps of:

(1) determining whether there is room to display the new window plus the predetermined gutter space to the right of the first window and within the screen and, if so, setting the position of the new window accordingly;

(2) else determining whether there is room to display the new window plus the predetermined gutter space to the left of the first window and within the screen and, if so, setting the position of the new window accordingly;

(3) else determining whether there is room to display the new window plus the predetermined gutter space below the first window and within the screen and, if so, setting the position of the new window accordingly;

(4) else determining whether there is room to display the new window plus the predetermined gutter space above the first window and within the screen and, if so, setting the position of the new window accordingly;

(5) else setting the position of the new window to the center of the screen.

16. The video processing system of claim 10, wherein means (d) and (e) comprise means for performing the steps of:

(1) determining whether there is room to display the new window plus the predetermined gutter space to the right of the first window and within the screen and, if so, setting the horizontal position of the new window to the right of the first window plus the gutter space;

(2) else determining whether there is room to display the new window plus the gutter space to the left of the first window and within the screen and, if so, setting the horizontal position of the new window to the left of the first window plus the gutter space;

(3) else setting the position of the new window to the center of the screen.

17. The video processing system of claim 16, wherein means (d) and (e) further comprise means for performing the steps of:

(4) if the position of the new window is not set to the center of the screen, then determining whether the top of the new window is above the top of the screen when the bottom of the new window is equal to the bottom of the first window and, if so, setting the top of the new window equal to the top of the screen;

(5) else determining whether the bottom of the new window is below the bottom of the screen when the bottom of the new window is equal to the bottom of the first window and, if so, setting the bottom of the new window equal to the bottom of the screen;

(6) else setting the bottom of the new window equal to the bottom of the first window.

18. The video processing system of claim 16, wherein means (d) and (e) further comprise:

(4) means for setting the vertical position of the new window such that the new window may be displayed within the top and bottom of the screen.

19. A computer-readable medium having stored thereon a plurality of instructions which, when executed by a processor of a video processing system, cause the processor to perform the steps of:

(a) determining the size of a screen of the video processing system;

(b) determining the position and size of a first window displayable on the screen;

(c) determining the size of a new window to be displayed on the screen;

(d) determining whether there is room to display the new window plus a predetermined gutter space outside the first window and within the screen; and (e) setting the position of the new window in accordance with the determination of step (d).

20. The computer-readable medium of claim 19, wherein the first window has a parent relationship with respect to the new window.

21. The computer-readable medium of claim 19, wherein the screen comprises a desktop window.

22. The computer-readable medium of claim 19, wherein the plurality of instructions further causes the processor to perform the step of:
   (f) displaying the new window on the screen at the position determined in step (e).

23. The computer-readable medium of claim 19, wherein step (e) executed by the processor comprises the step of:
   (1) if there is room to display the new window plus the predetermined gutter space outside the first window and within the screen, then setting the position of the new window such that the new window may be displayed outside the first window and within the screen with at least the predetermined gutter space separating the first window and the new window.

24. The computer-readable medium of claim 19, wherein steps (d) and (e) executed by the processor comprise the steps of:
   (1) determining whether there is room to display the new window plus the predetermined gutter space to the right of the first window and within the screen and, if so, setting the position of the new window accordingly;
   (2) else determining whether there is room to display the new window plus the predetermined gutter space to the left of the first window and within the screen and, if so, setting the position of the new window accordingly;
   (3) else determining whether there is room to display the new window plus the predetermined gutter space below the first window and within the screen and, if so, setting the position of the new window accordingly;
   (4) else determining whether there is room to display the new window plus the predetermined gutter space above the first window and within the screen and, if so, setting the position of the new window accordingly;
   (5) else setting the position of the new window to the center of the screen.

25. The computer-readable medium of claim 19, wherein steps (d) and (e) executed by the processor comprise the steps of:
   (1) determining whether there is room to display the new window plus the predetermined gutter space to the right of the first window and within the screen and, if so, setting the horizontal position of the new window to the right of the first window plus the gutter space;
   (2) else determining whether there is room to display the new window plus the gutter space to the left of the first window and within the screen and, if so, setting the horizontal position of the new window to the left of the first window plus the gutter space;
   (3) else setting the position of the new window to the center of the screen.

26. The computer-readable medium of claim 25, wherein steps (d) and (e) executed by the processor comprise the further steps of:
   (4) if the position of the new window is not set to the center of the screen, then determining whether the top of the new window is above the top of the screen when the bottom of the new window is equal to the bottom of the first window and, if so, setting the top of the new window equal to the top of the screen;
   (5) else determining whether the bottom of the new window is below the bottom of the screen when the bottom of the new window is equal to the bottom of the first window and, if so, setting the bottom of the new window equal to the bottom of the screen;
   (6) else setting the bottom of the new window equal to the bottom of the first window.

27. The computer-readable medium of claim 25, wherein steps (d) and (e) executed by the processor comprise the further step of:
   (4) setting the vertical position of the new window such that the new window may be displayed within the top and bottom of the screen.

28. A computer system, comprising:
   a screen;
   a memory having stored therein a conversion routine for positioning windows displayed on the screen; and
   a processor coupled to the screen and to the memory for executing the conversion routine to set the position of a new window to be displayed on the screen, wherein:
   (a) the size of a screen is determined;
   (b) the position and size of a first window displayable on the screen is determined;
   (c) the size of the new window is determined;
   (d) the processor determines whether there is room to display the new window plus a predetermined gutter space outside the first window and within the screen; and
   (e) the position of the new window is set in accordance with the determination of whether there is room to display the new window.

29. The computer system of claim 28, wherein the first window has a parent relationship with respect to the new window.

30. The computer system of claim 28, wherein the screen comprises a desktop window.

31. The computer system of claim 28, wherein:
   (f) the new window is displayed on the screen at the position of the new window.

32. The computer system of claim 28, wherein:
   (1) if there is room to display the new window plus the predetermined gutter space outside the first window and within the screen, then the position of the new window is set such that the new window may be displayed outside the first window and within the screen with at least the predetermined gutter space separating the first window and the new window.

33. The computer system of claim 28, wherein:
   (1) the processor determines whether there is room to display the new window plus the predetermined gutter space to the right of the first window and within the screen and, if so, the position of the new window is set accordingly;
   (2) else the processor determines whether there is room to display the new window plus the predetermined gutter space to the left of the first window and within the screen and, if so, the position of the new window is set accordingly;
   (3) else the processor determines whether there is room to display the new window plus the predetermined gutter space below the first window and within the screen and, if so, the position of the new window is set accordingly;
   (4) else the processor determines whether there is room to display the new window plus the predetermined gutter space above the first window and within the screen and, if so, the position of the new window is set accordingly;

(5) else the position of the new window is set to the center of the screen.

34. The computer system of claim 28, wherein:

(1) the processor determines whether there is room to display the new window plus the predetermined gutter space to the right of the first window and within the screen and, if so, the horizontal position of the new window is set to the right of the first window plus the gutter space;

(2) else the processor determines whether there is room to display the new window plus the gutter space to the left of the first window and within the screen and, if so, the horizontal position of the new window is set to the left of the first window plus the gutter space;

(3) else the position of the new window is set to the center of the screen.

35. The computer system of claim 34, wherein:

(4) if the position of the new window is not set to the center of the screen, then the processor determines whether the top of the new window is above the top of the screen when the bottom of the new window is equal to the bottom of the first window and, if so, the top of the new window is set equal to the top of the screen;

(5) else the processor determines whether the bottom of the new window is below the bottom of the screen when the bottom of the new window is equal to the bottom of the first window and, if so, the bottom of the new window is set equal to the bottom of the screen;

(6) else the bottom of the new window is set equal to the bottom of the first window.

36. The computer system of claim 34, wherein:

(4) the vertical position of the new window is set such that the new window may be displayed within the top and bottom of the screen.

* * * * *